June 27, 1933.  S. V. DILLON  1,915,719
VALVE
Filed March 8, 1929
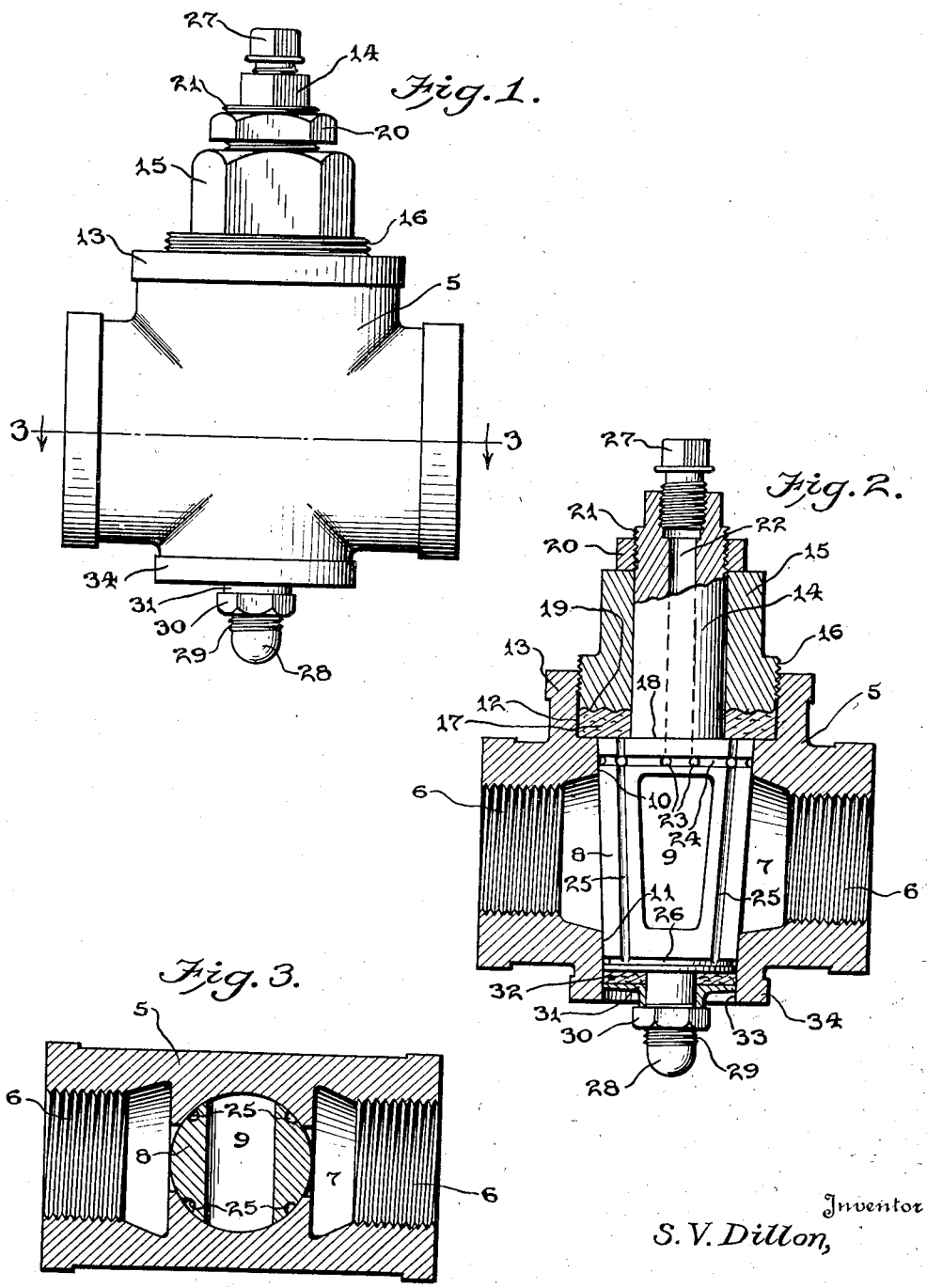
Inventor
S. V. Dillon,
By George A. Prevost
Attorney Patented June 27, 1933

1,915,719

UNITED STATES PATENT OFFICE

STEPHEN V. DILLON, OF TULSA, OKLAHOMA

VALVE

Application filed March 8, 1929. Serial No. 345,462.

This invention relates to improvements in valves, and more especially to a novel valve of the plug type.

The primary object of the invention is to provide a lubricated plug valve having improved packing means at opposite ends of the plug; the packing means at one end being mounted directly on the plug.

It is well known that the tapered plugs of valves of this character frequently stick to such a degree that the plug cannot be turned or even effectively loosened, without removing the plug from the casing, or taking the entire valve out of the line. Another object of this invention is to furnish a valve of this type, provided with special means for lifting the plug where such movement is possible, or to permit driving the plug from one end of the latter, where the plug cannot be properly loosened, by lifting the same. My improved means are so designed that the plug may be shifted axially without taking the valve out of the line, or without breaking the seals provided by the packing.

A further object is to provide a lubricated and sealed plug valve, the plug of which may be shifted axially by driving the same for instance, without liability of driving the plug out of the casing.

With the foregoing objects outlined and with other objects in view which will appear as the description proceeds, my invention consists in the novel features hereinafter described in detail, illustrated in the accompanying drawing, and more particularly pointed out in the appended claims.

Referring to the drawing,

Fig. 1 is an elevation of my improved valve.

Fig. 2 is a longitudinal vertical sectional view of the same.

Fig. 3 is a horizontal sectional view on the line 3—3 of Fig. 1.

In the drawing, 5 designates the valve casing, which may have conventional threaded ends 6, and has a passageway 7 therethrough. The flow of fluid through said passageway is controlled by a tapered plug 8 which has a port 9 to place the opposite ends of the passageway 7 in communication.

In my improved construction, the upper and lower ends of the frusto-conical portion of the plug bear against similarly shaped surfaces 10 and 11 in the casing, and the surface 10 is of annular form, and merges into an annular recess 12 that is formed within an upwardly extending nipple 13, provided at the top of the casing.

A cylindrical stem 14, forming part of the plug, extends upwardly through the nipple and is surrounded by a nut 15 which, at its lower end portion 16, has threaded engagement with the nipple. A packing ring 17, of any suitable material, is arranged between the lower end of the nut and the top 18 of the tapered portion of the plug, and this packing ring overlaps the contacting surfaces 10, and extends into the recess 12, whereby when the nut is screwed downwardly, the packing ring will prevent the passage of any fluid upwardly between the stem 14 and nut 15, and between the nut and the nipple 13. I prefer to make the under surface of the nut 15 of undulated form, as shown at 19, as this tends to prevent undue spreading of the packing ring and provides an increased bearing surface for the same.

It is manifest that when the nut 15 is screwed downwardly, the packing ring bearing on the shoulder 18 of the plug will tend to force the latter downwardly into its tapered seat.

To facilitate the lifting of the plug, in case the latter sticks, I mount a nut 20 on threads 21, arranged near the upper end of the stem 14, and normally, this nut occupies the position shown in Fig. 1, that is, it is elevated above the nut 15. However, when it is screwed down on the nut 15, as shown in Fig. 2, and then the nut 15 is unscrewed upwardly, the pressure brought to bear on the nut 20 will tend to lift the tapered portion of the plug off its seat, and thus allow the plug to be turned. In case it is impossible to loosen the plug in this way, the plug may be struck from below, and this feature will be explained hereinafter.

At this point, it may be noted that the tapered surfaces 10 and 11 are lubricated by means of a lubricant arranged in a reservoir 22, provided in the valve stem. This reservoir communicates at its lower end by means of transfer ports 23 with a horizontal groove 24 that conducts the lubricant to the contacting surfaces 10. Longitudinal grooves 25 in the plug, convey some of the lubricant down to an annular groove 26 that is arranged in the lower end of the plug. The last mentioned groove conveys the lubricant to the contacting surfaces 11.

I prefer to close the upper end of the reservoir 22 by a threaded plug 27, the adjustment of which may act to force the lubricant downwardly in the reservoir, so that the lubricant will be forcibly fed to the grooves heretofore mentioned. In this way, the plug may be properly lubricated at all times to facilitate the turning of the plug, and to prevent the sticking heretofore mentioned. As stated above, in case of sticking, and the operator's inability to loosen the plug by manipulating parts 15 and 20, the operator may place the nut 20 in the position shown in Figs. 1, and then unscrew the nut 15 slightly, to release the pressure which the packing ring 19 places on the shoulder 18. Then the operator may strike with a hammer or the like, on a depending pin 28 which extends downwardly from, and may form a part of the plug 8. This pin has threads 29 connected to a nut 30, and the nut bears against a metal washer 31, which in turn bears against a packing ring 32 that surrounds the pin and is expanded outwardly against a cylindrical surface 33, provided in a nipple 34 that depends from the body of the casing.

The tapered surface 11 merges into the surface 33, and as the latter is of cylindrical form, it may be seen that during loosening of the plug, either by raising the same from above, or by knocking the same upwardly from below, the packing ring 32, will always provide an effective seal, so that there will be no leakage, even when the plug is shifted for loosening purposes.

It will also be observed that regardless of the manner of shifting the plug upwardly, the shoulder 18, cooperating with the packing ring 17, if desired, will always prevent the plug from being moved out of the casing. Furthermore, as the parts 30, 31 and 32 are mounted on the pin 28, there will be no battering or shearing of the thread 29 while the plug is being hammered loose.

While I have disclosed what I now consider a preferred embodiment of my invention, it is obvious that changes may be made in the structure disclosed, without departing from the spirit of the invention as claimed.

What I claim and desire to secure by Letters Patent is:

1. A valve including a casing having a passageway therethrough and provided with oppositely disposed openings, a ported valve plug for controlling the passage of fluid through said passageway and having its ends projecting through said openings, one of said ends including a projecting pin, a packing ring surrounding said pin and bearing against the surface of one of said openings, and means on the pin and movable with the pin for compressing said packing, the packing compressing means including a washer arranged in the last mentioned opening, and a nut mounted on the projecting pin and bearing against said washer.

2. In a valve, a casing having a passageway therethrough and provided with oppositely disposed openings, a ported plug mounted in the casing and having its ends extending through said openings, the plug having a tapered portion and the casing having tapered surfaces engaging the tapered surface of the plug, means within the plug for furnishing lubricant to said tapered surfaces, said plug also including a cylindrical stem portion projecting from the larger end of the tapered portion and having a threaded part, a packing ring surrounding the cylindrical portion of the plug and bearing against the larger end of the tapered portion of the same, a first nut bearing against said packing ring having threaded engagement with the casing and provided with a cylindrical bore through which the cylindrical portion of the plug extends, and a second nut mounted on the threaded portion of the plug and adapted to be brought into engagement with the first nut to facilitate axial shifting of the plug by a movement of the first nut, said second nut being free to move axially away from the first nut.

3. A valve as claimed in claim 2, in which the smaller end of the tapered portion of the plug is provided with a projecting pin and a packing ring arranged on said pin and engaging the wall of one of said openings.

4. In a valve structure, a casing having a passageway therethrough and provided with oppositely disposed openings, a ported plug for controlling the flow of fluid through said passageway, said plug consisting of a tapered portion having a cylindrical stem projecting from its larger end through one of said openings, and a pin projecting through the other one of said openings, the plug having an annular shoulder at the place where the larger end of its tapered portion merges into the cylindrical stem, a packing ring surrounding the cylindrical stem and bearing upon said shoulder and upon a portion of the casing, a nut having threaded engagement with the casing and having a cylindrical bore through which the cylindrical stem extends, the outer portion of the cylindrical stem being threaded, a nut on the threaded portion of the cylindrical stem and movable toward and away from the first mentioned nut, the surface of the opening through which the pin extends being cylindrical, a packing ring surrounding the pin and engaging the last mentioned cylindrical surface, a washer on the pin arranged in the last mentioned opening and bearing against the last mentioned packing ring, and a nut on the pin bearing against said washer.

In testimony whereof I affix my signature.

STEPHEN V. DILLON.